Dec. 12, 1939.  E. V. RIPPINGILLE  2,183,031

PISTON COOLING ARRANGEMENT

Filed May 8, 1939

Inventor
Edward V. Rippingille

By
Attorneys

Patented Dec. 12, 1939

2,183,031

UNITED STATES PATENT OFFICE 2,183,031

PISTON COOLING ARRANGEMENT

Edward V. Rippingille, Detroit, Mich., assignor to General Motors Corporation, Detroit, Mich., a corporation of Delaware Application May 8, 1939, Serial No. 272,339

2 Claims. (Cl. 123—176)

This invention relates to a means of cooling the piston of an internal combustion engine, by dissipating the heat thereof to a suitable cooling medium.

It is becoming increasingly important to provide an adequate means of dissipating the heat from the pistons of internal combustion engines as engine speeds are increased, and especially in two cycle engines in which the pistons are exposed to twice the rate of heat development of a four cycle engine, if twice the power is to be obtained, other things being equal.

It has heretofore been proposed to cool the underside of the piston head by lubricating oil from the engine lubricating system. This has been effected by carrying oil thereto, from the crankshaft, through the connecting rod to the piston, and in other instances it has been projected directly on to the underside of the piston from a stationary pipe.

The carrying of cooling oil through the connecting rods, or its projection from a stationary pipe, involves more or less complication, if it is not actually difficult of accomplishment. In radial engines particularly, with a plurality of connecting rods to one crankpin or one master crankpin bearing, it is difficult to provide for a flow of cooling oil to the pistons, by either of the foregoing methods.

The object of the invention is a means of cooling a piston, by oil freely projected from a duct uncovered at the periphery of the crankpin, through a suitable phase angle of crankshaft rotation.

Another object of the invention is a construction to achieve the foregoing objects, in which the duct in the periphery of the crankpin, serves also to carry lubricating oil to the crankpin bearing surfaces.

The above and other objects of the invention, will be apparent as the description proceeds.

According to the invention, an oil duct through the crankshaft emerges at a point on that side of the periphery of the crankpin remote from the crankshaft axis, to carry lubricating oil to the crankpin bearing of the connecting rod. This duct is uncovered by the crankpin bearing of the connecting rod, during an arc of a suitable number of degrees of crankshaft rotation immediately before the connecting rod reaches its top dead center position, and lubricating oil emerging from said duct, is freely projected directly on to the underside of the piston head, by forces which are the resultant of the oil pressure and centrifugal and tangential forces, during said arc of crankshaft rotation, to cool the piston.

In a radial engine with a plurality of connecting rods with slipper ends on a single crankpin, the cooling oil is successively projected to the underside of the heads of each of the respective pistons as they approach their top dead center position, through the space separating the slipper end of that connecting rod approaching its top dead center position and the slipper end of that connecting rod next behind it in the direction of rotation of the crankshaft.

The drawing shows the application of the invention to a four cylinder radial engine with slipper type connecting rods.

In the drawing

Figs. 2, 3 and 4 show the same parts as Fig. 1 in successively later positions, of which Fig. 4 shows the connecting rod of the piston of Fig. 1, in its top dead center position.

Figure 1:
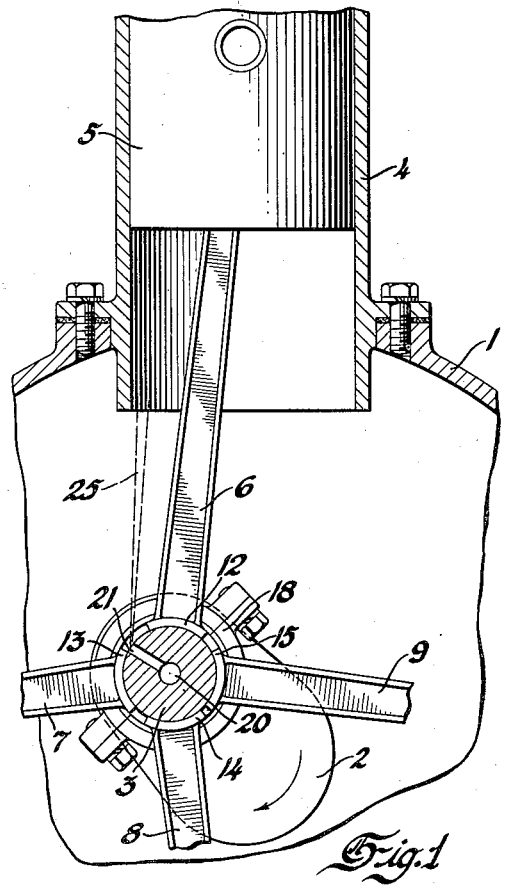
Fig. 1 shows one cylinder of a four cylinder radial engine, its piston and connecting rod in a position approaching their top dead center position, the crankshaft, and the corresponding position of the other three connecting rods.

The engine frame 1, carries the crankshaft 2 with a crankpin 3, and supports four equally spaced radially disposed cylinders of which only one is shown. Within each of the cylinders such as 4 is a piston such as 5.

The pistons have connecting rods 6, 7, 8 and 9 respectively provided with slipper bearing ends 12, 13, 14 and 15 on the crankpin 3, and retained in bearing engagement therewith by a retaining ring bearing 18.

An oil duct 20 extends through the crankshaft, to carry oil under pressure, in conventional manner (not shown), from a suitable source of supply, to the various bearing surfaces of the crankshaft. Only the duct 21, for converging oil from the duct 20, to the slipper bearings of the connecting rods on the crankpin 3, is shown in the drawing.

The duct 21 extends radially from the duct 20 to the periphery of the crankpin 3 at a point remote from the crankshaft axis, and is approximately in the plane of the crankpin and crankshaft axes.

It will be seen that the arc of separation between the slippers 12, 13, 14 and 15 is greatest between the slipper of the connecting rod 6 of that piston 5 which is approaching its top dead center position and the slipper of that connecting rod 7 next behind it in the direction of rotation of the engine, and that as the crankpin 3 turns relatively to the slippers, the external orifice of the duct 21 will be uncovered only through this arc of greatest separation as the top dead center position of each of the pistons in turn is approached.

The oil emerging from the orifice of the duct 21 is thrown along a path substantially parallel with the connecting rod, by forces which are the resultant of the oil pressure and centrifugal and tangential forces. Stroboscopic observations show that these paths are essentially the same at all speeds but that the volume of oil projected on to the underside of the piston head is increased as the speed rises, which is of course desirable.

Figure 2:
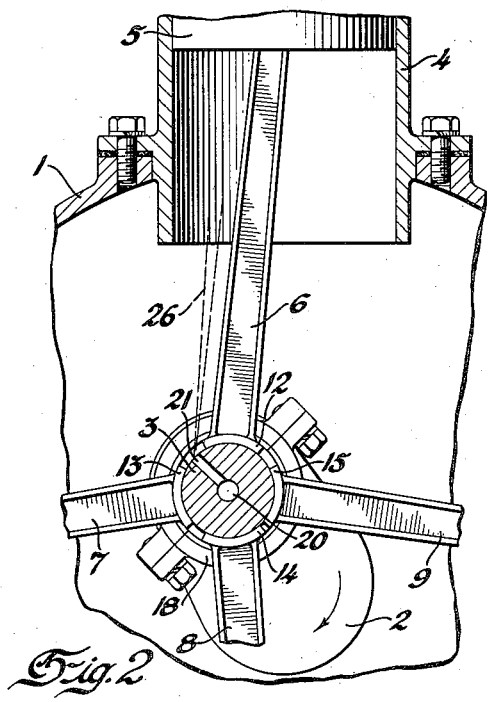
Figure 3:
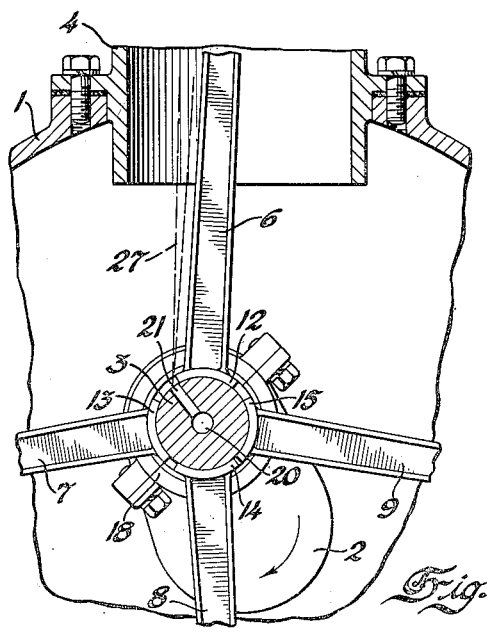
Figure 4:
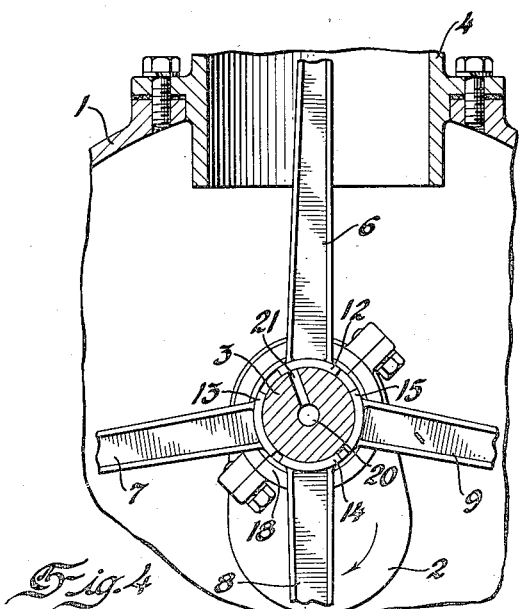

In Figs. 1, 2 and 3 the loci of the increments of oil projected from the orifice of the duct 21 directly on to the underside of the head of piston 5 in successive time intervals of the rotation of the crankshaft 2, are indicated by the broken lines 25, 26 and 27 respectively.

In the example illustrated, the cooling oil is projected on to the respective pistons during an arc of crankshaft rotation of approximately 30°, beginning about 60° and ending about 30° before the top dead center position of each of the pistons in turn, which has been found satisfactory.

It will be appreciated, that the invention is not alone applicable to engines with slipper type connecting rods, that it is only necessary that the duct 21 should be suitably disposed and uncovered at the proper time, and that there should be nothing to hinder free projection of the oil directly on to the piston. In the case, for instance, of an engine with a single piston and connecting rod to a crankpin, and a conventional big end bearing on the connecting rod, it is only necessary to slot the bearing on the "following" side of the connecting rod, to form a port extending through a suitable arc, which may be an arc of 30°, beginning about 60° and ending about 30° before top dead center position of the connecting rod, provided the oil duct in the crankpin is disposed approximately as shown.

Furthermore it will be obvious that other things being equal, the amount of oil projected on to the underside of the piston will depend on the size of the duct 21, and that when desirable, a group of such ducts may be substituted for the single duct shown.

I claim:

1. In an internal combustion engine, in combination, a cylinder, a piston, a connecting rod and a crankshaft with a crankpin, and means including a duct in the crankshaft, emerging at a point on that side of the periphery of the crankpin remote from the crankshaft axis, to carry lubricating oil to the crankpin bearing of the connecting rod; said duct being uncovered by the crankpin bearing of the connecting rod during an arc of a suitable number of degrees of crankshaft rotation immediately before the connecting rod reaches its top dead center position, whereby said piston will be cooled by lubricating oil emerging from said duct and freely projected to the underside of the piston head, by forces which are the resultant of the oil pressure and centrifugal and tangential forces during said arc of crankshaft rotation.

2. The combination according to claim 1, in which the engine is a radial engine with a plurality of connecting rods with slipper ends on a single crankpin; there being a maximum arc of separation between the slipper end of that connecting rod approaching its top dead center position and the slipper end of that connecting rod behind it in the direction of rotation of the crankshaft, through which cooling oil is successively projected to the underside of the heads of each of the respective pistons as they approach their top dead center position.

EDWARD V. RIPPINGILLE.